United States Patent

[11] 3,594,537

[72] Inventor Fritz Morgenegg
 Neuhofstrasse, 3422 Kirchberg/BE, Switzerland
[21] Appl. No. 794,855
[22] Filed July 29, 1969
[45] Patented July 20, 1971
[32] Priority Jan. 31, 1968
[33] Switzerland
[31] 1515/68

[54] ANGULARLY ADJUSTABLE HOLDER FOR MACHINE-TOOL BITS
 8 Claims, 8 Drawing Figs.

[52] U.S. Cl. .................................................. 219/69, 279/5
[51] Int. Cl. ................................................. B23p 1/08
[50] Field of Search ........................................ 219/69 E, 69 F, 69 D; 279/5, 42

[56] References Cited
UNITED STATES PATENTS
2,374,348 4/1945 Harding ................ 219/69 E
2,922,022 1/1960 Mironoff ............... 219/69 E
3,474,215 10/1969 Johanson ............... 219/69 E FOREIGN PATENTS
93,037 2/1922 Switzerland ............. 279/5

Primary Examiner—R. F. Staubly
Attorney—Karl F. Ross

ABSTRACT: A bit holder depending from a cross-slide or other movable support has a socket with a spherically curved seat for a tubular shaft terminating at the bottom in a chuck designed to clamp a tool bit, specifically a channeled spark-erosion electrode, in alignment with its axis passing through the center of curvature of the spherical seat. The shaft has a spherically curved bulge resting on the seat, under pressure from a spring-loaded retaining ring, and is tiltable about the aforesaid center of curvature under the control of several adjusting screws bearing from different sides upon the upper end of the shaft within the socket. The interior of the shaft above the stem of the electrode is occupied by an ejector rod forming passages for a scavenging fluid between the channeled stem and a flexible hose slidably extending from a lateral opening of the shaft through a nipple seated in a side aperture of the socket.

PATENTED JUL 20 1971
3,594,537
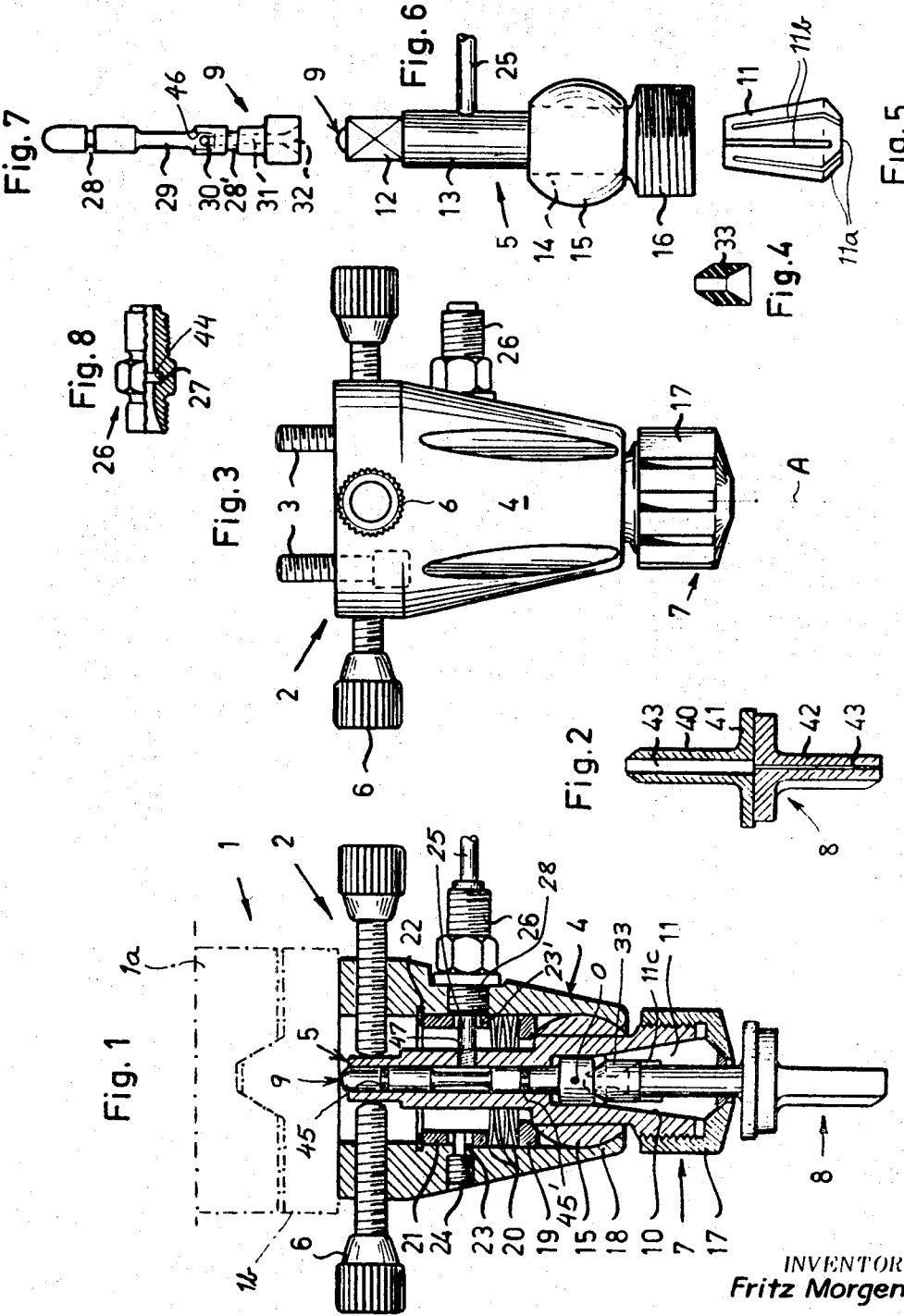
INVENTOR:
Fritz Morgenegg
BY
Karl F. Ross
ATTORNEY

ANGULARLY ADJUSTABLE HOLDER FOR MACHINE-TOOL BITS

My present invention relates to a bit holder for machine tools, more specifically (though not exclusively) to a holder for an electrode used in spark-erosion machining.

In the serial machining of workpieces to small tolerances, as by the spark erosion process, it is essential that the position of the bit remain essentially unchanged for the processing of successive workpieces. In practice however, it is frequently impossible to set aside a separate holder for each tool bit whereby, upon a subsequently rerun of the same type of operation, the bit could be remounted on its mobile support more or less exactly in its previous attitude.

It is, therefore, a general object of my present invention to provide a holder for a tool bit, such as a spark-discharge electrode, enabling the precise adjustment of the bit to a predetermined position, specifically a position in line with or inclined at a predetermined angle to an axis extending substantially perpendicularly to the direction of motion of a movable tool support.

This object is realized, pursuant to my present invention, by the provision of a socket secured to a rotatable or slidable support, such as a pair of mutually perpendicular slides, so that the longitudinal axis of the socket is essentially at right angles to the plane of motion of the support. The socket is internally provided with a spherically curved seat whose center of curvature lies on the axis and which accommodates a complementarily curved bulge on a preferably tubular shaft; the bulging shaft portion is held in position by retaining means formed, advantageously, as a collar under axial pressure from a stack of Belleville springs or equivalent resilient elements. A protruding extremity of the shaft carries an exchangeable chuck or the like for clamping tool bits of different sizes in place; the opposite end of the shaft is engaged by adjusting means, such as a set of radially extending bolts threaded into the socket, bearing laterally upon the shaft from different sides for maintaining the shaft at a selected angle of inclination (which could be zero) relative to the socket axis.

With the tool bit designed as a channeled electrode to be traversed by a scavenging fluid, the holder shaft may be provided with a lateral opening having a flexible conduit for the working fluid attached thereto; this conduit advantageously passes outwardly through a side aperture containing a nipple in which the flexible conduit, e.g. a nylon hose, may be slidably guided. The fluid can also be used for cooling purposes and, especially in the case of a solid tool bit without channels, may be allowed to flow outwardly between the jaws of the chuck.

To facilitate the detachment of the tool bit from the clamping means at the working end of the shaft, I prefer to dispose an ejector rod axially within the shaft in engagement with the chuck holding the bit. If the latter is a channeled electrode, a fluid passage formed by the ejector rod communicates with the electrode channel through a gasket fitted into a hollow tip of the rod and forming a fluidtight connection with the chuck. For this purpose, the chuck is advantageously composed of interconnected jaws forming an axially recessed neck to hold the gasket in contact with a tubular stem of the electrode, this stem enabling rotation of the electrode through 360° within the chuck before closure of its jaws.

The above and other features of may invention will be described hereinafter in greater detail with reference to the accompanying drawing in which:

FIG. 1. is an axial sectional view of an electrode holder according to the invention having an electrode inserted therein;

FIG. 2 is an axial sectional view of the electrode of FIG. 1;

FIG. 3 is a side-elevational view of the holder of FIG. 1;

FIG. 4 is an axial sectional view of a gasket forming part of the assembly of FIG. 1;

FIG. 5 is a side-elevational view of a chuck forming part of the assembly of FIG. 1;

FIG. 6 is a side-elevational view of a tubular shaft included in the assembly of FIG. 1;

FIG. 7 is a side-elevational view of an ejector rod forming part of the assembly of FIG. 1; and FIG. 8 is a side-elevational view, partly in section, of a connecting nipple secured to the holder of FIG. 1.

In FIG. 1 I have shown in dot-dash lines a conventional tool support 1 comprising a longitudinal slide 1a and a cross-slide 1b, mounted on a machine frame not further illustrated. Secured to the lower slide 1b, with the aid of upstanding screws 3 (FIG. 3), is a bit holder 2 according to the invention comprising a socket 4 whose longitudinal axis A extends at right angles to the plane of motion of slide 1b. Socket 4 accommodates in its interior a tubular shaft 5 having a spherically bulging midportion 15 received in a complementarily curved seat 18 of socket 4, the bulge 15 being advantageously formed as a ball-shaped ring press-fitted onto a cylindrical part 14 (FIG. 6) of the shaft. Thus, shaft 5 is tiltable in any direction about the center of curvature 0 of seat 18, being held in position by a retaining ring or collar 19 whose inner surface is spherically grooved in conformity with that of ball 15 on which it bears. Collar 19 is overlain by a stack of Belleville springs 20 which are compressed between the collar and a sleeve 21, the latter acting upon a snapring 22 sprung into an annular groove of socket 4.

A set of four transverse bolts 6, spaced 90° apart, are threaded into the upper rim of socket 4 and bear upon the prismatically faceted upper end 12 of shaft 5 from four different sides. Thus, joint adjustment of the bolts 6 enables the shaft 5 to be swung about its fulcrum 0 in either of two mutually perpendicular planes so that this shaft may assume any angular position with reference to the holder axis A.

The lower extremity of shaft 5 is formed with a frustoconical recess 10 accommodating a replaceable chick 11 which, as best seen in FIG. 5, is of unitary construction and consists of several integrally interconnected clamping jaws 11a separated by slits 11b. The top of the chuck 11 forms a neck axially recessed at 11c to receive a tubular gasket 33 of rubber or other elastomeric material. This gasket hears in a fluidtight manner upon the upper end of a cylindrical stem 40 (FIG. 2) of an electrode 8 here shown to consist of two generally mushroom-shaped portions 41, 42 with aligned axial channels 43, 43' for the passage of a scavenging fluid. Channel 43 communicates through gasket 33 with an axial bore 31 in the lower end of an ejector rod 9 slidably seated in the upper part of shaft 5, the bore 31 terminating in a frustoconical recess 32 which engages the top of gasket 33 with a fluidtight fit. Axial bore 31 opens at its upper end into a transverse bore 30 of rod 9 terminating at two shallow, diametrically opposite recesses 46 (FIG. 7) so as to form part of a continuous passage for the working fluid from channel 43 to a lateral opening 47 in the upper part 13 of shaft 5 into which a flexible hose 25 is threaded. This hose, e.g. a Nylon tube, passes with sliding fit through a nipple 26 screwed into a side opening 28 of socket 4, the interior of the nipple having an annular groove 27 with an O-ring 44 (FIG. 8) which forms a fluidtight seal about the slidable hose 25. Similar seals are formed by O-rings 45 and 45' (FIG. 1) seated in peripheral grooves 28, 28' (FIG. 7) of rod 9 above and below a reduced portion 29 of the rod which confronts the conduit 25 so as not to block the fluid flow between this conduit and the lateral recesses 46.

As clearly shown in FIG 1, sleeve 21 has two diametrically opposite slots 23 and 23', the first one receiving the pointed end of a setscrew 24 to prevent relative rotation of the sleeve and the socket, the second one allowing for the passage of hose 25.

The lower end 16 of shaft 5 is threaded and engaged by a clamping assembly 7 including a retaining nut 17 serving to force the chuck 11 into firm engagement with the stem 40 of electrode 8 after the latter has been placed in a desired rotary position.

With the arrangement described and illustrated, the orientation of the electrode 8 relative to axis A can be varied over a substantial angle and, owing to the relatively large lever arm between fulcrum 0 and the point of contact of shaft 5 with screws 6, can be adjusted with a precision on the order of onetenth to one-hundreth of a millimeter. This degree of adjustability allows for compensation of even small tolerances introduced upon an unprecise soldering of the two electrode portions 41, 42 to each other. If the electrode is to be exactly axially positioned in the holder, this position can be verified by vertically raising and lowering the support 1 while holding a of a micrometric truing gauge feeler successively onto opposite sides of the electrode surface to observe the absence of a deflection of an associated pointer; with very thin electrodes, which could be damaged by physical contact with a measuring instrument, a visual micrometer may be used.

I claim:

1. In a machine tool having a support movable substantially at right angles to an axis, the combination therewith of a bit holder comprising a socket secured to said support and centered on said axis, said socket being internally provided with a spherically curved seat having a center of curvature on said axis; a tubular shaft with a lateral opening and with an extremity projecting from an end of said socket, said shaft having a spherically curved bulge matingly received in said seat for enabling tilting of said shaft about said center; adjusting means in said socket bearing laterally upon an end of said shaft opposite said extremity for maintaining same at a selected inclination relative to said axis; retaining means in said socket bearing upon said bulge for holding same onto said seat; and clamping means at said extremity engageable with a tool bit to be moved transversely to said axis by said support; said tool bit being an electrode with an axial channel for a working fluid; flexible conduit means terminating at said opening for establishing a path for the working fluid leading from the outside to said channel through the interior of said shaft; and an ejector rod extending axially within said shaft from said opposite end thereof to said clamping means for contact with said electrode, said rod forming a passage for said working fluid.

2. The combination defined in claim 1, wherein said rod has a hollow tip forming part of said passage and opening toward said channel, further comprising a gasket fitted onto said tip to form a fluidtight connection between said passage and said channel.

3. The combination defined in claim 2 wherein said clamping means comprises a chuck with interconnected jaws forming an axially recessed neck receiving said gasket.

4. The combination defined in claim 1 wherein said socket if provided with a side aperture confronting said lateral opening and with a nipple seated in said aperture, said conduit means comprising a hose slidably received in said nipple.

5. In a machine tool having a support movable substantially at right angles to an axis, the combination therewith of a bit holder comprising a socket secured to said support and centered on said axis, said socket being internally provided with a spherically curved seat having a center of curvature on said axis; a tubular shaft with a lateral opening and with an extremity projecting from an end of said socket, said shaft having a spherically curved bulge matingly received in said seat for enabling tilting of said shaft about said center, said socket being provided with a side aperture confronting said lateral opening and with a nipple seated in said aperture; adjusting means in said socket bearing laterally upon an end of said shaft opposite said extremity for maintaining same at a selected inclination relative to said axis; and clamping means at said extremity engageable with a tool bit to be moved transversely to said axis by said support; said tool bit being an electrode with an axial channel for a working fluid; flexible conduit means terminating at said opening for establishing a path for the working fluid leading from the outside to said channel through the interior of said shaft, said conduit means comprising a hose slidably received in said nipple; and retaining means in said housing bearing upon said bulge for holding same onto said seat, said retaining means including a sleever received with a sliding fit in said socket and stop means holding said sleeve in a fixed axial position, said sleeve being provided with a slot accommodating said hose.

6. The combination defined in claim 5 wherein said sleeve is formed with a second slot and said socket is provided with a detent member extending radially inwardly into said second slot for preventing rotation of said sleeve about said axis.

7. The combination defined in claim 5 wherein said retaining means further comprises a collar slidable in said socket in contact with said bulge and resilient means interposed between said sleeve and said collar for exerting pressure through the latter upon said bulge.

8. The combination defined in claim 7 wherein said resilient means comprises a stack of Belleville springs.